United States Patent Office 3,159,831
Patented Dec. 1, 1964

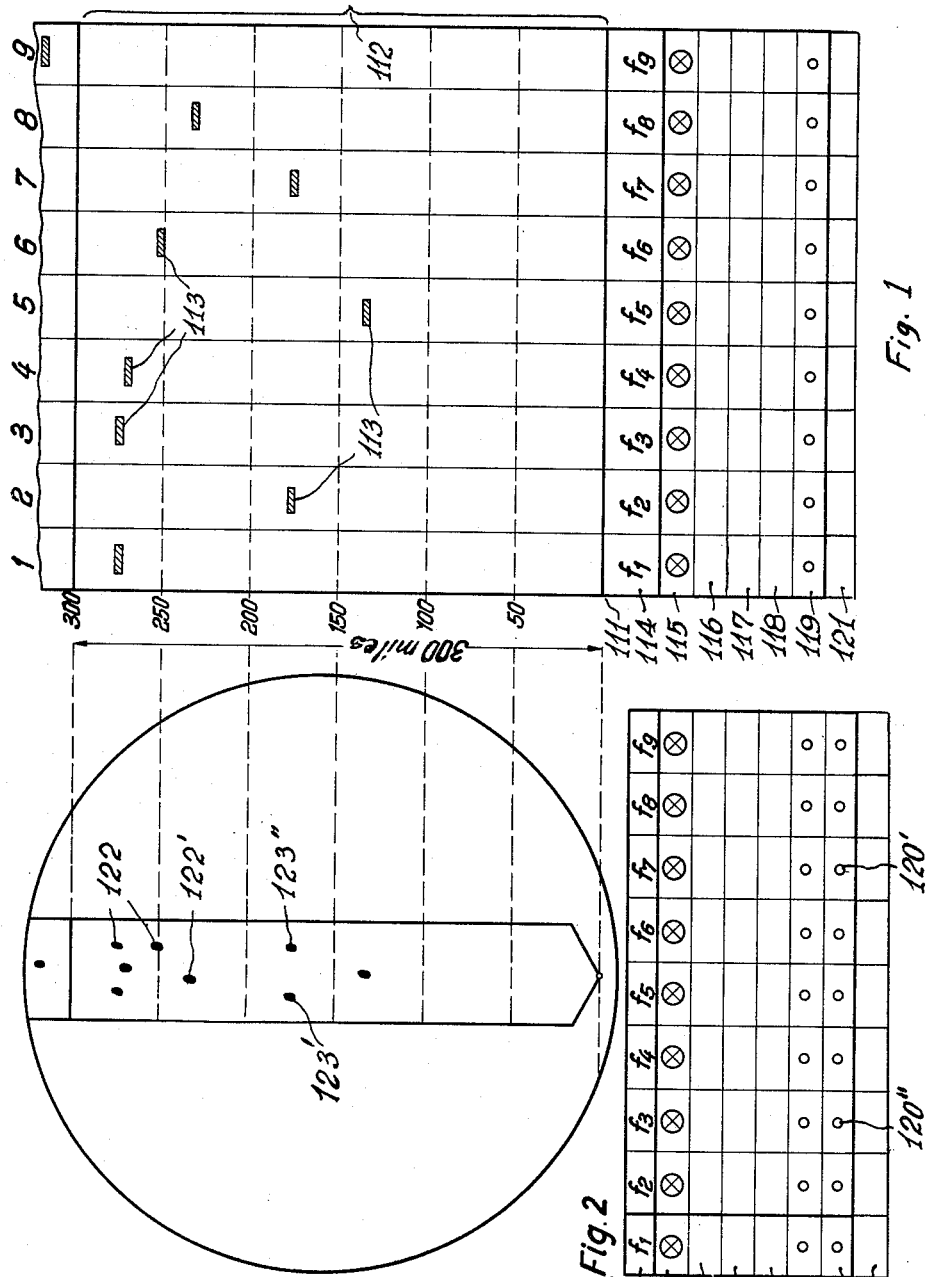

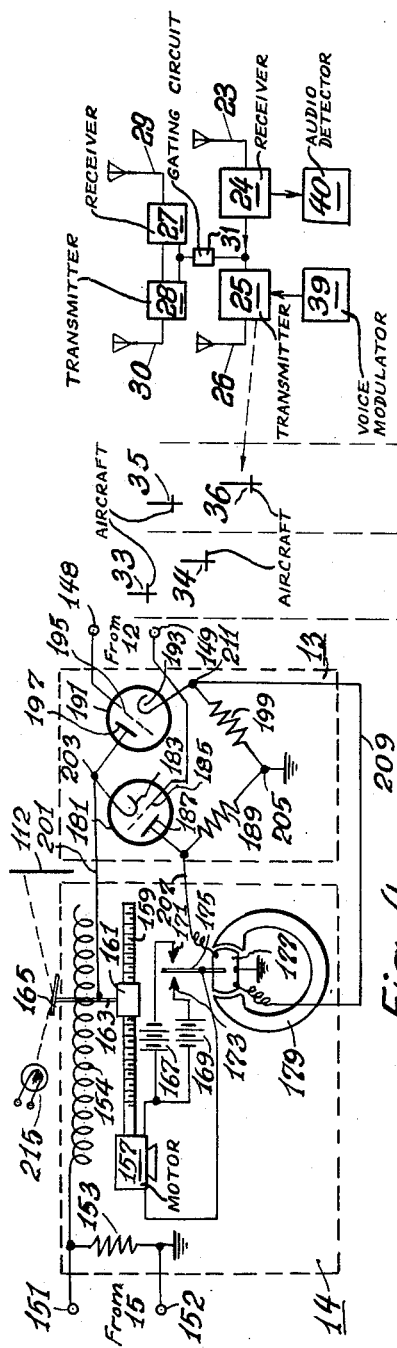

3,159,831
AIR TRAFFIC CONTROL
Herbert Muth, Neu-Ulm (Danube), Germany, assignor to Telefunken Aktiengesellschaft, Berlin, Germany
Filed June 4, 1958, Ser. No. 739,913
Claims priority, application Germany June 5, 1957
9 Claims. (Cl. 343—6)

This invention relates to apparatus and methods for controlling the flight of aircraft along a predetermined route and upon landing in predetermined areas.

Because of the recent increase in air traffic, it is particularly necessary to supervise the approach and departure of aircraft to and from an airport so as to avoid air collisions. In the past, the most common means for controlling air traffic at an airport was by means of radar. All planes within the range of the radar system at the airport appeared as marks on the radar screen. From the radar scopes, it was possible not only to identify the individual aircraft, but also to determine its distance from the radar antenna and the direction of its movement. However, neither the elevation nor the type of aircraft could be determined from viewing the screen alone. Also, the actual route of the aircraft, as well as its velocity, could not be determined by radar.

Since aircraft may fly at any of a plurality of predetermined altitudes, the elevation of each plane approaching an airport must be known by the airport control tower for the operators to determine whether or not there is danger of imminent collision. The use of the radar beam to communicate information other than the direction and the distance of the aircraft from the antenna has been suggested. It has been contemplated that the radar equipment will also be utilized for two-way communication between the radar installation and the aircraft in flight utilizing automatic equipment to transmit, during that period of time in which the radar antenna is directed at the individual aircraft, information relating to its bearing, altitude and speed. One of the many disadvantages of these proposals is the fact that the information transmitted by the automatic equipment in the aircraft could not be projected onto the screen of the radar scope at the point where that particular aircraft is displayed, thus giving the operator all of the information at one location. Such additional communication equipment would be suitable for use where individual aircraft only were displayed on a single screen, since it would be obvious that the received data was from that aircraft alone.

It is, therefore, an object of the present invention to provide new and improved methods and apparatus for the control and supervision of air traffic approaching and leaving an airport.

It is another object of this invention to provide a new and improved means for presenting information of the air traffic adjacent a particular air field.

It is a further object of this invention to provide new and improved apparatus for supervising the control of traffic approaching and leaving an air field, which apparatus provides information of the speed, the altitude, the distance, and the bearing, of each aircraft leaving or approaching the field.

It is a still further object of this invention to provide new and improved apparatus and methods of radio communication between the surface installation at a particular air field and the aircraft approaching and leaving that airfield, whereby the aircraft may be properly controlled by utilizing the information transmitted therebetween.

Briefly, the apparatus for determining the speed of the aircraft comprises a transmitter at the air station for transmitting to the individual aircraft a particular type of radio signal. The radio signal is selectively modified by the individual aircraft and is rebroadcasted. The returned signal, which is then picked up by the land station, is decoded to provide information proportional to the distance between the aircraft and the airfield, which is displayed in an assigned location on a display screen. The display screen is divided into a plurality of vertical columns, each column being assigned to a particular approaching or leaving aircraft. The distance of each aircraft from the tower is indicated in the appropriate column by the spacing of a marker from a horizontal line thereon, the spacing between the marker and the line being proportional to the distance of the aircraft from the tower. Other information pertaining to individual aircraft approaching or leaving the airfield may be displayed upon additional appropriate blocks in the column assigned to the individual aircraft.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a diagrammatic showing of a display screen for the information obtained by the apparatus of this invention;

FIGURE 2 is a diagrammatic illustration of a radar screen shown in relationship to the display screen of FIGURE 1;

FIGURE 3 is a block diagram of the apparatus of this invention; and

FIGURE 4 is a schematic circuit diagram of a portion of the apparatus of FIGURE 3.

Referring in more detail to the drawings and, particularly to FIGURE 1, the reference characters 1 to 9 designate vertical columns on a display screen, each column being arbitrarily assigned to display the information received from an individual aircraft. In addition to the division of the screen into a plurality of vertical columns, each column is also divided horizontally into a plurality of blocks. The dashed lines which designate the boundaries of the individual blocks each represents a particular distance from the airport tower. For example, on the display as illustrated in FIGURE 1, the line designated 111 represents the location of the airport tower, or zero distance. From the line 111 upward towards the top of the sheet, the area bounded by the bracket 112 represents the distance from the airport tower to the individual aircraft within the range of the device of this invention.

The display screen 112 of FIGURE 1 is one on which light images are projected, the hatched rectangles 113, shown in the blocks of FIGURE 1, being just such light images which are projected from the back of the screen and viewed from the front. Each rectangle 113 represents an individual aircraft, the column in which it is situated identifying the particular aircraft in question. The position of the image 113 with respect to the zero line 111 gives an indication of the distance from the airport tower of that particular airplane. For example, considering column 1, the light image 113 indicates that this particular aircraft is approximately 275 miles away from the tower. The light images may be projected upon the screen in any manner, for example, they may be spots of light, such as would be generated by flashlights, cathode ray tubes, and the like, or they may be shadows which may be produced by interjecting bodies between a source of light and the screen 112. The screen 112 may be formed of ground glass, a translucent plastic material, or any other such substance suitable for viewing light images. In addition to that portion of the screen 112 which represents the range of the instrument, in this case 300 miles, there is provided an upper portion of the screen representing those aircraft which are more than 300 miles away from the airport tower. One such image is illustrated in column 9 of FIGURE 1. Since any aircraft farther than 300 miles from the airport tower is outside of the range of the apparatus of this invention, all information obtained about that aircraft is transmitted to the receiving air port by cable or other such communication medium. In this manner, the airport to which the aircraft is approaching has full information concering all of the aircraft which it can expect and, when the particular aircraft comes within the 300 mile range, the destination airport begins to receive its own information directly from the aircraft, said information then being maintained current.

Below the zero line 111 on the screen 112 is a row 114 containing the letters $f_1-f_9$. This row 114 displays the frequency upon which communications with the aircraft of that particular column is being maintained. The row 115 immediately below row 114 contains a plurality of control lamps which indicate when the aircraft wishes to communicate with the tower of the destination airport. Below row 115, there is another row 116 in which the approximate arrival time of the aircraft is displayed. Row 117, immediately below row 116, indicates the speed of the various aircraft as they are determined by changes in the distance of the aircraft from the tower during pre-selected periods of time. The next row 118 contains information unique to the particular aircraft of that column and is relayed from the home airport to that of the destination airport by cable, such as by teletype, or by radio communication, or any other form of communication maintained between airports. This particular row 118 contains information which pertains to the airline, the aircraft number, the flight number, the type of aircraft, the time of takeoff and the estimated time of arrival, the flight plan which may include information as to the altitude and bearing of the aircraft and other such pertinent information. Row 119 contains a plurality of pushbutton switches to trigger speech modulation, and the details of this operation will be explained in greater details below. The bottom row 121 displays information which relates to the deviations of the individual aircraft from prescribed routes of travel. These deviations may include changes in altitude, bearing and/or speed and may be derived, for example, by direct oral communication with the pilot of the aircraft. However, electronic equipment may be used to provide some of this information for instance the speed. This may be accomplished as described below. Thus, it can be seen that the display screen of FIGURE 1 displays the information pertinent to an aircraft in flight which is needed by the approaching airport for proper control and landing of this aircraft. For example, a glance by a control tower attendant at the screen of FIGURE 1 conveys the information that the airplane of column 2 and that of column 7 are each at approximately the same distance from the airport. From the other information displayed thereon, he can immediately recognize whether or not the two aircraft are on similar flight patterns, at similar altitudes, and are bearing in the same directions. From this, it is a simple matter for him to determine whether the two aircraft will arrive at approximately the same time or whether one will precede the other.

However, one pertinent point of information is not displayed on the screen of FIGURE 1. For the control tower of the destination airport, it is necessary to know how far apart the two aircrafts are which are travelling in the same general direction and which are approaching the airport, in order that it can determine whether there is sufficient distance between the two planes to prevent collision. This information can be determined from a radar screen, such as that illustrated schematically in FIGURE 2.

On the screen of FIGURE 2, there are projected a plurality of aircraft images at approximately the same scale as that of the screen of FIGURE 1, so that judging of distances is facilitated. Since the images projected on the screen of FIGURE 2 represent individual aircraft, it is a simple matter for the observer to correlate the positions of the individual aircraft with the information contained on the screen of FIGURE 1 and, thereby, determine the spacing between those aircraft which are travelling similar routes and which are approximately the same distance from the airport. For example, a glance at the screen of FIGURE 2 suffices to show an observer that the two planes of columns 2 and 7 of FIGURE 1 are sufficiently apart to prevent any collision.

In addition to the radar display screen of FIGURE 2, it might be desirable to provide adjacent thereto a second chart or display area, giving the pertinent information contained in columns 114 to 121. The buttons or keys 120 are used to broadcast a special signal and this will be discussed below. Thus, in FIGURE 2, there is shown, in addition to the radar display screen, a rectangular display screen having the pertinent information contained in FIGURE 1. In this way, the information necessary for good operational procedure is available to the observer of the radar screen, as well as to the observer of the distance display screen. It is to be understood, that these screens may be projection screens and may be as large as a wall of a room. In addition, the number of columns is not limited to nine, as shown herein, and the information contained in the rows may be other than that described while still being within the scope of this invention.

The use of these two devices reduces the number of personnel necessary to control the air traffic in a large airport to two attendants. One attendant keeps the complete display screen of FIGURE 1 under constant observation, noting those aircraft which approach the airport close enough to come within the flight patterns of the airport and controlling their flight to that point. Another observer maintains the radar screen and its associated information of FIGURE 2 under constant surveillance, to ensure that the spacing of the aircraft is such that no collisions are imminent. He also observes those aircraft which deviate from their pre-selected courses, because of bad weather or other reasons. When such deviations from a prescribed course are noted, this second observer may then communicate with the pilot to supply him with such information that will enable him to return to his proper course.

The apparatus for accomplishing the communication referred to above is illustrated in block form in FIGURE 3, wherein the reference character L designates the approach air corridor leading to an airfield F. The width of the appoach L may be in the order of 10 miles. The destination airport tower is located at point B, which is located at one end of the airfield F. The proportions of FIGURE 3 are somewhat distorted in order to represent the entire system on one figure. It is to be understood that the relative proportions of the width of the air pattern, the size of the airfield, and the equipment contained on the drawing in block form are for content only and not for proportions.

The equipment at the tower B includes a transmitter 10 by which communications may be had with all of the aircraft by means of an antenna 11. Transmitter 10 operates on a basic frequency $f_0$ and is modulated by a distance-determining signal originating in a signal generator 12. In addition to modulating the carrier of the transmitter 10 by the distance-determining signal generated by 12, the transmitter may also be modulated selectively by designated code frequencies in accordance with prescribed information. The transmitter 10, as shown in FIGURE 3, comprises sixteen buttons 119 and 120, each of which controls a means for modulating the carrier of transmitter 10 with a unique fixed frequency signal.

In the airway L, there are shown four aircraft as crosses, designated 33, 34, 35 and 36. Each aircraft is equipped with a transmitter-receiver combination comprising a receiving antenna 23 connected to the input of a receiver 24, which demodulates the received radio energy, as shown in FIGURE 3. A transmitter 25 transmits its signals by means of a transmitting antenna 26. The receivers 24 of all of the aircraft are tuned to the frequency $f_0$ of the transmitter 10 of the ground station B. However, each of the transmitters 25 of the individual aircraft is tuned to a unique frequency. Thus, by way of illustration, the transmitter 25 of the aircraft 33 may be tuned to a frequency $f_1$, whereas that of the aircraft 34 may be tuned to a different frequency, as for instance $f_2$. It should be understood, however, that each of the aircraft contains a receiver 24 and a transmitter 25 together with the necessary antennas. In the receiver 24, the modulated signal from the transmitter 10 is demodulated and the demodulated signal obtained by the receiver 24 is fed to transmitter 25 to modulate its unique radio frequency and to be rebroadcasted. The information thus transmitted from the tower B is received by all of the aircraft, and each aircraft then rebroadcasts the same coded signal on its individually assigned frequency.

In addition to the transmitter 10, the airport control tower B is also equipped with a plurality of receivers, each of which is tuned to a frequency assigned to one of the aircrafts. In FIGURE 3, only two such receivers 16 and 21 are illustrated to avoid unduly cluttering the drawing. Signals broadcast on a frequency $f_1$ by plane 33 are received by the antenna 17 and fed into a receiver 16, where they are demodulated in a demodulator 15 and are then fed to a phase shifter 14, which, in turn, feeds a bridge circuit 13. The bridge circuit 13 is normally balanced by the application of the signal from the source 12 and the detected signal from the phase shifter 14 in opposition. When these two signals applied to the bridge circuit 13 do not balance each other, an error signal is generated in the bridge 13 and is returned by line 51 to the phase shifter 14 to vary the phase shift of the signal passing therethrough by an amount and in a direction sufficient to rebalance the bridge 13. The phase shifter 14 may be provided with a means which indicates the amount of phase shift correction necessary to cause a rebalancing of the bridge 13, and this indication would then be an indication of the distance of the aircraft from the airport tower. The operation of the distance-determining equipment is completely automatic, since the signals broadcasted by the transmitter 10 are automatically received by receiver 24 in the airplane, detected and rebroadcast at that aircraft's own unique frequency by means of transmitter 25. The retransmitted signals are then picked up by the receiver 16, demodulated by 15, and the demodulated signal is compared with the original signal from 12. This operation continues automatically without any conscious control of the pilots for aircraft which are both approaching and leaving any particular airport. If the indicator connected to the phase shifting device 14 is also equipped with a differentiating system, the rate of change of the indication can also be determined and this will correspond to the speed of the airplane. Thus, the phase shifter 14 can provide not only an indication of the instantaneous position of the aircraft, but also of its velocity through space.

A second such receiver 21, having a receiving antenna 22 and a demodulator circuit 20 feeding the demodulated signal to a second phase shifting circuit 19 which provides a bridge 18 with a signal to be compared with the original signal from 12, is also shown in FIGURE 3. This equipment is identical to that described immediately above, except for the frequency to which the receiver 21 is tuned, which is that of a second aircraft. But the equipment operates essentially the same as that described above. This type of system may be extended by such duplication to any desired number of aircraft.

In addition to the transmitter 10, the airport has a radar station. The radar transmitter 41 is a standard piece of radar equipment which generates high frequency pulses and broadcasts those pulses by means of a highly directional rotating antenna. As the pulses move through space, they are intercepted by objects in their path and are reflected back to the radar receiver 42. This distance from the equipment to the object reflecting the pulses is determined by the phase, or time, difference between the transmitted and received reflected signal. In addition to the transmitter 25 and the receiver 24, which are a part of the communication equipment of each aircraft, each aircraft also contains a second receiver 27 and a transmitter 28. A special signal broadcasted by the transmitter 10 upon the depression of one of the keys 120 produces a signal which is received by the receiver 24 and is detected by a special detector 31. This signal is then transmitted to the receiver 27 and the transmitter 28 to enable them for proper operation. Radar signals are received by the antenna 29 for detection by the receiver 27. After suitable delay, the detected radar signals are fed to the transmitter 28 to modulate its carrier and are rebroadcast over the transmitter antenna 30. In this manner, an aircraft displayed on a radar screen can be identified by the selective rebroadcast through its equipment of the radar pulses.

In addition to the equipment described above, an audio modulating system 37 is provided for the transmitter 10, whereby the radio frequency energy being broadcast over the antenna 11 may be voice-modulated under the control of the airport tower personnel. By the same token, the equipment in the aircraft, namely the receiver 24, has associated with it audio-detection equipment 40 for detecting any voice-modulated signals received by the antenna 23 under the control of the aircraft personnel. The transmitter 25 also has voice-modulating equipment 39 connected thereto, so that the aircraft personnel may communicate with the ground stations by means of transmitter 25. In addition to a detector 20 for the modulated signal from the generator 12, the receiver 21 also has an audio demodulator 48 for voice broadcasts from the transmitter 25 of the aircraft. The same is true of the receiver 16 which has a detector 38 for the purpose of demodulating voice broadcasts.

In considering the operation of the communication equipment of FIGURE 3, one of the basic thoughts to keep in mind is the fact that each aircraft has assigned to it a unique broadcast frequency upon which its communications with its home and destination airports are maintained. The frequency of operation of each particular airplane is relayed by wire transmission, such as by teletype, from the home airport of the aricraft which it is leaving, to the destination of the aircraft along with such information as the plane type, the airline, the time of departure and of arrival, the proposed flight route, and other such pertinent information. When the aircraft comes within supervision range of its destination airport, its identity is established by the rebroadcast by its transmitter 25 of those signals transmitted by the ground transmitter 10. In addition, information may be stored within appropirate equipment on the aircraft itself to be relayed to the ground station. Such information, which can identify the aircraft by name, type, flight number, and flight plan, may be stored on such equipment as magnetic tape, facsimile equipment, or programming drums having pins for contacting appropriate electrical contacts. When the proper time for transmitting this information to the destination airport has been determined by the pilot, he may initiate such transmission which will then be taken care of automatically. The drum containing pins is caused to rotate, the pins contact the appropriate electrical contacts and signals generated thereby are transmitted by the transmitter 25 and received by receiver 16 to be demodulated by the detector 38 for the information of the ground station. The magnetic tape and facsimile equipment would operate similarly, the appropriate messages being coded by a magnetic spot on the tape and the information being recorded in pictorial form upon appropriate records for the facsimile equipment. All of this information, regardless of how it is stored on the aircraft, is transmitted by the transmitter 25 at the particular frequency assigned to that particular aircraft at that particular time. This information is then received by a single receiver only in the airport ground equipment. By this receiver, the aircraft is again identified and the information received is correlated with the information originally transmitted by wire from the airport from which the aircraft departed. In addition to the information of identity stored in the appropriate equipment on the aircraft, the pilot may have additional information which he desires to communicate with the airstrip of his destination. Such information may be information as to head winds, changes in his proposed flight plan, due to storms, changes in time of arrival, his estimated present position, and data of such nature which he has determined only during the flight of the aircraft. This information is also transmitted over his transmitter 25 at the unique frequency assigned to that particular aircraft.

All radio communication originating at the airport is carried out by means of transmitter 10 which broadcasts on a single frequency $f_0$. This single carrier frequency may be either frequency or amplitude modulated, as desired, and all information broadcasted the ground station serves a modulation of this basic transmitter frequency. If the tower personnel of the airport wishes to carry on voice communication with a particular aircraft, the button switch 119, associated with that aircraft, is depressed. These buttons appear in both FIGURE 3 on the transmitter 10 and in FIGURES 1 and 2 as buttons 119 and 119', respectively. When each button is depressed, the carrier frequency $f_0$ of the transmitter 10 is modulated by a particular code frequency. This frequency is received in all aircraft by the appropriate receivers 24, but it is detected only by the aircraft having the appropriate filtering circuits. Upon detection of this code signal, the aircraft equipment is automatically switched to voice communication and the detector 40 is energized. By this means, the surface installation B may communicate directly with a particular aircraft under its supervision without the information being needlessly transmitted to all of the other aircraft in its range. It should be remembered that only the airplane having the filtering equipment responding to the particular frequency broadcast over the transmitter 10 at that instant will be able to receive voice communication, while all other receiving equipment will remain disabled.

The distance of the aircraft, as determined by bridge 13 and phase shifter 14, may be referred to the tower B, to transmitter 10 or, if the equipment is sufficiently sensitive, it may be referred to the actual landing strip of the airport on which the aircraft will land as a zero, or datum plane. The distances determined by the equipment 14 and 13 are constantly changing as the aircraft approaches the field, and with appropriate differentiating equipment, the change in the distance determination can also be used to indicate the relative speed of the aircraft. The position of the aircraft as determined by the phase shifting equipment 14 and the bridge 13 may be used to determine the position of a light beam or shadow on the screen 112 of FIGURE 1.

One form of phase shifter 14 and bridge 13 is illustrated schematically in FIGURE 4, wherein the terminals feeding the detected signal from the detector 15 are shown to the left of this figure and are designated 151 and 152. Connected across terminals 151 and 152 is a resistor 153 which is in parallel with a variable inductor 154. A motor 157 is arranged to drive a worm 159 which has mounted thereupon a worm follower 161, such as a split nut. Mounted on the split nut 161 is a wiper arm 163 which sweeps across the turns of the inductor 154. Carried at the one end of the wiper arm 163 is a mirror 165. The motor 157 can rotate in either of two directions, depending upon which of two power supplies 167 and 169 are connected to it. The connection of the particular power supply is controlled by a switch having stationary contacts 171 and 173 and a movable contact 175 which is mounted upon a rotary coil 177, such as a meter coil, said coil being supported within the field of a permanent magnet 179. The structure described this far comprises the phase shifter 14.

The detector circuit 13 comprises a bridge formed of a triode 181 having a cathode 183, a control grid 185 and an anode 187. A second triode 191, having a cathode 193, a control grid 195 and an anode 197, is arranged in such a way, that the anode 197 is connected to the cathode 183 of the triode 181 at junction point 203. Another leg of the bridge is formed by a resistor 189 having one end connected to the anode 187 and its other end connected at junction point 205 to one end of a second resistor 199, which is the fourth leg, and the other end of which is connected to the cathode 193 at junction point 211. The wiper arm 163 of the inductor 154 is connected by means of a wire 201 to the junction point 203 between the cathode 183 and the anode 197. The junction 205 between the resistor 189 and the resistor 199 is connected to ground to establish a complete circuit from the input terminal 151 through the inductor 154, the line 201, to the terminal 203, where the circuit passes through either of the triodes 191 or 181 and through its respective resistor 199 or 189 to the terminal 205 and then to ground. The terminal 152 is also connected directly to ground. The input from the generator source 12 is connected to terminals 148 and 149 which are shown to the right of the figure, the terminal 148 being connected to the control grid 195 of the triode 191 and the terminal 149 being connected to the control grid 185 of the triode 181. The junction between the resistor 189 and the anode 187 of the triode 181 is connected by a wire 207 to one side of the coil 177, the center tap of the coil being grounded. The junction 211 of the resistor 199 and the anode 193 is connected by wire 209 to the other side of the coil 177.

The operation of the device is such that the input signal from the detector 15 is applied through the terminals 151 and 152 to the junctions 203 and 205 of the bridge circuit. Since the junction 203 is the junction between the cathode 183 and the anode 197, when the terminal 151 is positive with respect to ground, a positive voltage with respect to ground is applied to the cathode 183 and the anode 197. At the same time the ground terminal 152 will be negative with respect to terminal 151, and this negative signal is applied at junction 205 through the resistor 189 to the anode 187 and through the resistor 199 to the cathode 193. If, at the same time, the signal from the generator 12 applied to the terminal 148 is positive with respect to ground and that on 149 is negative with respect to terminal 148, then the control grid 195 of the triode 191 will have a signal applied thereto which is positive with respect to cathode 193, and a signal which is negative with respect to cathode 183 will be applied to the control grid 185 of the triode 181. Recapitulating, the triode 191 has a positive voltage applied to its anode 197 and a second positive voltage applied to its control grid 195. This triode will then conduct, the conduction through the tube being from the positive terminal 203 through the tube 191, down through resistor 199 to terminal 205, and through ground back to terminal 152. Since triode 181 has negative voltages applied to both its anode and to its control grid, no current flows therethrough. The current flowing through resistor 199 is such that the terminal 205 is negative and the junction point 211 is positive. The wire 209 connects the terminal 211, or the positive side of the resistor 199, to one side of the coil 177 and current flows through the wire 209, through one half of the coil 177, through ground to terminal 205 and back to the other side of the resistor 199. This causes the coil 177 to be deflected in a first direction, closing the circuit between the movable contact 175 and the stationary contact 173. Thus, the power supply 169 is connected to the motor 157 to drive the worm 159 and cause the wiper arm 163 to move across the coils of the inductor 154. In this manner the phase shift of the circuit 14 is varied until there is no current flowing from the bridge circuit 13. The phase relationship between the signal from the generator 12 and from the detector 15 should be such that when a positive voltage appears on the anode 197 of triode 191, a negative voltage should appear upon its control grid 195, and when the anode 197 is negative, the grid 195 should be positive. The same situation should prevail with respect to triode 181. The operation when triode 191 conducts has been described. The triode 181 conducts on the other half of the cycle or, when the terminal 152 has a positive voltage applied thereto and the terminal 149 goes positive. Thus, it can be seen that the bridge 13, in effect, determines when the two signals from the detector 15 and from the generator 12 are not completely out of phase. When this occurs the motor 157 is energized in the proper direction to drive the wiper arm 163 across the inductor 154 and so modify the phase shift of the phase shifter 14 until the proper phase relations are again established between the two circuits. The instantaneous position of the wiper arm 163 is an indication of the phase difference between the two input signals and therefore the distance of a particular aircraft from the airport. This is indicated on the screen 112 by the position of the mirror 165. A light source 215, which may be energized from any convenient source of light, projects a beam of light on the mirror 165 which, in turn, reflects that beam of light onto the screen 112. As the wiper arm 163 is moved to restore the balance in the bridge 13, the mirror 165 is also moved, and the point at which the light beams strike the screen 112 is changed in proportion to the movement of the mirror 165. Thus, the device of FIG. 4 not only rebalances the bridge 13, but also gives a direct indication on the screen 112 of the distance of a particular aircraft from the airport.

The circuit of FIG. 4 is but one illustration of apparatus which will operate properly in this invention. It is not necessary that a phase shifter 14 and the associated rebalance circuit be provided. If a bridge or other phase comparator 13 is used similar to that illustrated in FIG. 4, an error voltage is generated when the two signals are out of phase. The current flow through the tubes 181 and 191 is proportional to the phase relation between the two input signals, the more in phase the two signals are the greater the current flow. This flow of current through the two tubes 181 and 191 may be used directly to deflect a mirror type galvanometer which would then project a light image upon the screen 112 at positions which are in proportion to the amount of current flowing through the circuit. In this type of circuit, no rebalance system is required and the phase shifter 14 is unnecessary.

It is well within the realm of possibility that air traffic at major airports in the near future may become so great that the number of incoming and outgoing aircraft will soon reach the point where there are insufficient frequencies available for the assignment of a separate frequency band to each individual aircraft. In this case, a time sharing of the same frequency may be considered. In this type of operation it is contemplated that the receiver 24 and transmitter 25 of the aircraft will not be in operation constantly to give a constant determination of the distance of the aircraft from the airport, but that each aircraft will have its individual receiver-transmitter equipment triggered by the application of a special code frequency modulated on the carrier $f_0$ of the transmitter 10. Then the equipment 24 and 25 need be triggered for only 5 or 10 seconds at a time, and the distance indication determined by the surface equipment will periodically be used to deflect the mirror or other type equipment to produce an appropriate display on the screen 112. In this manner the basic frequency of the transmitter 10 will be modulated for 5 seconds by a special code signal to operate a gate circuit similar to that of 31 in FIG. 3, which will then enable the receiver 24 and the transmitter 25 to detect the signal from the generator 12 and to reuse that signal to modulate the transmitter 25, and the ground equipment will then detect the received signal and give an indication of the position of that aircraft. At the end of the 5-second interval a second code signal will be used to modulate the carrier of the transmitter 10 and a second aircraft will have its receiver and its transmitter enabled so that its position may be determined. Thus, several aircraft may use the same frequency and only the code modulation for gating the aircraft will be changed. The code signals modulating the carrier of transmitter 10 are of very narrow band width and very large numbers of such code signals may be used. Of course, the movement of the indications 113 on the screen 112 will not be uniform and smooth but will be in jumps at predetermined intervals. It is not too long a delay to determine the position of individual aircraft at intervals of two minutes. Thus, if we consider that each aircraft uses 5 second in which its position is determined, the positions of 12 aircraft may be determined each minute or a total of 24 different airplanes may use the same frequency. This will greatly increase the versatility of the equipment.

It was mentioned above that the changes in the setting of the phase shifter 14 in rebalancing the bridge 13 may be utilized to indicate the speed of a particular aircraft. In this connection differentiating equipment may be connected between the free end of the inductor 154 and the slide member 163 to differentiate any current or voltage changes due to the movement of the slide member 163 over the coils of the inductor 154. By differentiating these changes the time rate of change of position of the aircraft can be determined, and this is equivalent to the velocity. Since such equipment may take many forms, no circuit is given in this specification, but it should be borne in mind that such equipment is well within the scope of this invention.

So far, the operation of the equipment of this invention has been described as performed by personnel in the aircraft tower. However, operation by the personnel alone may ofttimes be too slow to prevent collisions and may be too inaccurate for most efficient operation. For example, suppose an aircraft is forced suddenly to deviate from its prescribed course. The pilot, of course, realizes that such deviation has taken place but he can, at best, estimate his position or the amount of deviation from the course. The deviation may be readily observed on the radar screen of FIG. 2, and, by appropriate use of this equipment, the radar observer may determine when such deviation results in two aircraft coming too close together. The radar screen indicates the spacing between the aircraft in a horizontal direction but does not give the relative elevation of the aircraft, which must be determined from the information below screen 112 of FIG. 1. However, when the radar operator observes that an aircraft has suddenly approached a second aircraft, he may relay this information to the observer of the screen 112 who then determines whether or not the two aircraft are at similar altitudes. If it has been determined that, because of such course deviations, one aircraft is entirely too close to another, the operators then depress the appropriate button 119 to enable the broadcast equipment 40 and 39 in the aircraft so that voice communication may be established. The pilot of one aircraft is instructed to change his course to avoid collision, and, when he has moved to a safe distance from the other aircraft, he is then instructed to position his ship so as to again arrive at his original course. This quite often results in oscillation of the aircraft about its prescribed course, and sometimes these oscillations are large enough to increase the possibility of collision as the aircrafts approach the airport. If, instead of the personnel, who are operating the equipment which receives this information, analyzing it and communicating by voice with the pilot of the aircraft, the equipment were to be connected to computer devices, then the incoming information obtained from the radar screens and the screen 112 may be analyzed by the computer, and control signals for the automatic pilots of the aircraft derived thereby to maintain the individual aircraft on more accurate courses. The combination of a computer on the ground and automatic pilot in the aircraft can react faster than the human observers and the human pilot of the aircraft. Proper courses may be maintained more readily and more accurately, and the danger of collision greatly reduced. Also, because of a high rate of computer operation, the overall rate of utilization of the equipment may be increased without decreasing the resulting accuracy. For proper operation of such devices, it is required that each aircraft have its preliminary information recorded in a storage device as suggested earlier. During the operation of the aircraft and as the aircraft approaches the airport, this information is automatically fed to the ground station and is received by the computer apparatus. Thus the information describing the desired operation of the airplane is received by the computer directly, and variations from this operation will then be detected by the computer equipment which generates proper control signals to maintain the deviations at a minimum.

A further use of the equipment illustrated in FIG. 3 utilizes the receiver 27 and the transmitter 28 in the aircraft. When a pilot deviates somewhat from his course so as to increase the possibility of trouble, an appropriate switch button 120 can be depressed by the radar observer. This operation of the button 120 causes a special code signal for that particular aircraft to be modulated on the carrier $f_0$ of the transmitter 10 which is detected by the receiver 24 to operate a gate circuit 31 and enable the receiver 27 and the transmitter 28 in the aircraft itself. The radar signal broadcast by the radar transmitter 41 is then received by the receiver 27, and the code signal is used to modulate the return radar signal which is then rebroadcast by transmitter 28. This rebroadcast radar signal is detected by the radar receiver 41 at the ground station, and since it is modulated, the received radar signal creates an image on the screen which appears to be oscillating or to have light areas about the center portion. This unique light image is more readily observable and indicates a particular aircraft. By the use of television equipment the images appearing on the face of the radar screen may be broadcast to appropriate television receiving equipment in the individual aircraft so that the television picture may be observed by the pilot therein. The projection of the television image in a particular aircraft will indicate to the pilot of that aircraft that his ship, the one which is represented by the special image, is in danger of imminent collision and he may take steps to correct that condition. This type of operation may be used in conjunction with the radio communication by means of the receiver 39 and transmitter 40 to indicate to the individual pilots the situation with respect to their aircraft.

Another expedient which may be used to prevent duplicate calls by the two observers of the two screens is a special locking circuit which connects the individual respective keys of the switch boards available to each of the operators. The keys 119 and 119' are duplicated on the radar equipment and on the equipment adjacent screen 112. They should be interconnected by appropriate locking devices, which may be, for example, solenoid operated, so that when the key of one of the panels is depressed it immediately locks that key of the other panel. In this manner simultaneous duplicate messages which interfere with each other are prevented. When the observer of the screen 112 is communicating with the pilot of an aircraft and the radar observer wishes to communicate with the same aircraft, the radar observer soon realizes that communication between the other observer and the aircraft is being carried on since he finds it impossible for him to depress the desired key.

In addition to controlling the aircraft while in flight to avoid possible collision and to maintain as safe a trip as possible, the equipment of this invention may also be used to control the aircraft in landing. It is quite common for airfields to have equipment which make constant measurements of the altitude and rate of approach of an aircraft. The distance from a particular landing strip is determined by the equipment illustrated in FIG. 3, and the approach angle may be readily observed from a large scale radar system. This information may be used to remotely operate the automatic pilot in the aircraft by means of the transmitter 10, so that the aircraft will be controlled in landing as safely as it was in flight. If control of the automatic pilot is not deemed feasible, such information as may be determined from observing the the screens of the appropriate equipment may be transmitted to the individual pilots by the proper associated equipment or by the aforementioned television broadcast equipment. The apparatus of this invention prevents conflict with messages of one aircraft and those of another allowing such information to be safely communicated to the pilots. Thus, each individual aircraft receives its information which is pertinent to its course only, and landings are more positive and better controlled.

Ordinarily aircraft approaches an airport approach along a particular air corridor. If an additional piece of equipment is used, the apparatus of this invention may also be able to determine when aircraft are not sufficiently within the boundaries of the corridor to ensure a proper approach. In FIG. 3 instead of the radar receiver described above, the block 42 may be a receiver-transmitter combination having a highly directional rotating radio beacon. This antenna receives signals from approaching aircraft and may be used to determine when an aircraft is not within the prescribed boundaries of the approach corridor. When such an aircraft is discovered, the broadcast equipment illustrated and described above may be used to inform the pilot of that particular aircraft of his irregular approach and to offer instructions on the proper means for correcting that approach.

This specification has described and illustrated a new and improved radio communication system for airports by means of which the proper approach and landing of aircraft is maintained more accurately and with less possibility of collision. The described invention may be used on board military installations such as aircraft carriers to ensure the proper approach and carrying out of the assigned mission in addition to the described land installations. A reading of this application will suggest to those skilled in the art other means for carrying out the principles of this invention without invention thereover, and it is intended that this invention be limited only by the scope of the appended claims.

What is claimed is:

1. A system for supervising from a control station a plurality of aircraft traveling in an air corridor, comprising a data presentation board divided longitudinally into a plurality of columns each associated with a particular aircraft; two-way radio communication means in each aircraft and adjustable to frequencies assigned to the particular aircraft and for transmitting a modulating signal; two-way radio means at the control station for transmitting a modulating signal to the aircraft and having a plurality of receiving means each corresponding with one of the columns and tuned to receive the frequency assigned to the associated aircraft, said presentation board being transversely divided into a scale of distances from the control station to the aircraft; distance measuring means connected with each of said control station receiving means and responsive to the modulating signal transmitted to a corresponding aircraft and to the modulating signal received from the corresponding aircraft for measuring distance; and board marking means actuated by each distance measuring means and continuously presenting a mark in each column of the board representing the measured distance to the associated aircraft.

2. In a system as set forth in claim 1, said board having crossed lines adjacent to its columns and forming rows providing space for pertinent indicia including the identity of the aircraft associated with said columns, the transmission frequencies assigned to each aircraft, the aircraft speeds, the estimated times of arrival; and at least one row of controls connected for control of the radio communication equipment at the central station for transmitting selected unique frequencies.

3. In a system as set forth in claim 2, a second board associated with a P.P.I. presentation and having columns and rows registering with said previously mentioned columns to receive indicia including the identity of the aircraft, the transmission frequencies assigned to each aircraft, the aircraft speeds and their estimated times of arrival.

4. In a system as set forth in claim 1, a radar scanner at said station and having P.P.I. presentation images, and said board being laid off in columns, each representative of a separate aircraft, the board being located adjacent to the P.P.I. so that the distance scale on the P.P.I. presentation is the same as the distance scale on said board and so that the boundaries representative of the corridor are parallel with said columns.

5. The method of indicating on a presentation board the distances of a plurality of aircraft in an air corridor from a central station, including the steps of transmitting to the aircraft in the corridor a signal modulated by a low frequency and further modulated by a selective aircraft call frequency for enabling the voice communication channel in the aircraft corresponding with the particular aircraft call signal transmitted; automatically rebroadcasting the said low frequency from each aircraft on separate carrier frequencies each assigned to one aircraft; separately receiving each of the separate low-frequency modulated carriers; determining the phase-delay between the low frequency transmitted from the station and the low frequency received at the station from each aircraft; and displaying markings on the board in adjacent columns each representing an aircraft and indicating the phase delays measured and hence the distances of the associated aircraft from the station.

6. In the method as set forth in claim 5, the step of simultaneously radar-echo scanning the aircraft in the corridor while communicating with one selected aircraft; and automatically triggering in the selected aircraft auxiliary transmitting means tuned to the radar scanning frequency to identify the echo returning from the selected aircraft.

7. The method of indicating on a single board the distances of a plurality of aircraft in an air corridor from a central station, including the steps of transmitting to the aircraft in the corridor a signal modulated by a low frequency and further modulated by a selective aircraft call frequency for enabling the voice communication channel in the aircraft corresponding with the transmitter in the aircraft corresponding with the particular selective call frequency transmitted; automatically rebroadcasting the low-modulated frequency from the selected aircraft on a carrier; receiving the low-frequency modulated carrier at the central station; determining the phase-delay between the transmitted low frequency and the low frequency received at the station from the aircraft; and displaying markings on the board in adjacent columns each representing an aircraft and indicating the phase delays measured and hence the distance from the station to the selected aircraft.

8. In the method as set forth in claim 7, the step of simultaneously radar-echo scanning the aircraft in the corridor while communicating with one selected aircraft; and automatically triggering in the selected aircraft auxiliary transmitting means tuned to the radar scanning frequency to identify the echo returning from the selected aircraft.

9. The method as set forth in claim 7, wherein the signals are received at the aircraft and rebroadcast therefrom on different carrier frequencies.

References Cited in the file of this patent
UNITED STATES PATENTS

| | | |
|---|---|---|
| 1,750,668 | Green | Mar. 18, 1930 |
| 2,444,452 | Labin | July 6, 1948 |
| 2,470,787 | Nosker | May 24, 1949 |
| 2,471,416 | Deloraine et al. | May 31, 1949 |
| 2,535,048 | Deloraine et al. | Dec. 26, 1950 |
| 2,568,926 | Moran | Sept. 25, 1951 |
| 2,622,240 | Fleming-Williams | Dec. 16, 1952 |
| 2,677,119 | Luck | Apr. 27, 1954 |

OTHER REFERENCES

IRE Transactions, Aeronautical and Navigational Electronics, vol. ANE-2, June 1955, No. 2, pages 14-22, copy in 343-11.